(12) United States Patent
Hu et al.

(10) Patent No.: US 12,453,723 B2
(45) Date of Patent: Oct. 28, 2025

(54) USE OF CHIDAMIDE IN PREPARING DRUG FOR TREATING RENAL FIBROSIS

(71) Applicant: THE SECOND AFFILIATED HOSPITAL OF SOOCHOW UNIVERSITY, Suzhou (CN)

(72) Inventors: Zhanhong Hu, Suzhou (CN); Yumei Liu, Suzhou (CN); Liwen Mao, Suzhou (CN)

(73) Assignee: THE SECOND AFFILIATED HOSPITAL OF SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/964,259

(22) Filed: Nov. 29, 2024

(65) Prior Publication Data

US 2025/0108041 A1  Apr. 3, 2025

(30) Foreign Application Priority Data

Dec. 8, 2023 (CN) .......................... 202311681804.8

(51) Int. Cl.
  *A61K 31/4406*  (2006.01)
  *A61P 13/12*  (2006.01)
(52) U.S. Cl.
  CPC .......... *A61K 31/4406* (2013.01); *A61P 13/12* (2018.01)
(58) Field of Classification Search
  CPC .............................. A61K 31/4406; A61P 13/12
  See application file for complete search history.

(56) References Cited

U.S. PATENT DOCUMENTS

2022/0244263 A1  8/2022 Graeber et al.

FOREIGN PATENT DOCUMENTS

| CN | 112386593 A | 2/2021 |
| CN | 112439070 A | 3/2021 |
| CN | 112741833 A | 5/2021 |
| CN | 115418341 A | 12/2022 |
| EP | 2 949 326 A2 | 12/2015 |
| WO | WO-2011/147584 A1 | 12/2011 |
| WO | WO-2021/188849 A1 | 9/2021 |

OTHER PUBLICATIONS

Chun, "Therapeutic effects of histone deacetylase inhibitors on kidney disease", Arch. Pharm. Res. (2018) 41:162-183.*
Yan et al., "Effects of chidamide on proliferation, apoptosis and invasion in human renalcarcinoma 786-0 cells and its mechanisms," Chinese Journal of Immunology, Sep. 27, 2019, pp. 2233-2237,2242 (6 pages), Issue 35, vol. 18.

* cited by examiner

*Primary Examiner* — Sahar Javanmard
(74) *Attorney, Agent, or Firm* — Muncy, Geissler, Olds & Lowe, P.C.

(57) ABSTRACT

The present disclosure relates to the technical field of use of chidamide in drug preparation, particularly to use of chidamide in preparing a drug for treating renal fibrosis. The present disclosure proves that the chidamide can significantly improve the fibrosis of TGF-β stimulated HK2 cells. The chidamide significantly improves the renal fibrosis of UUO mice and ameliorates the renal fibrosis through a PI3K/Akt signaling pathway, so that the present disclosure has wide clinical application prospects.

8 Claims, 14 Drawing Sheets

USE OF CHIDAMIDE IN PREPARING DRUG FOR TREATING RENAL FIBROSIS

TECHNICAL FIELD

The present disclosure relates to the technical field of use of chidamide in drug preparation, in particular to use of chidamide in preparing a drug for treating renal fibrosis.

BACKGROUND

Renal fibrosis is a common pathway and a main pathological basis for the progression of a chronic kidney disease to an end-stage kidney disease. Under the action of multiple factors, a signaling pathway regulating an inflammatory reaction in cells is activated, Activation of immune cells are activated, and cytokines are released, leading to proliferation of fibroblasts, mesenchymal transition of renal tubular epithelial cells, production of excessive extracellular matrixes, so as to ultimately result in renal fibrosis. The existing drugs such as a renin-angiotensin system inhibitor (RASi) only can finitely delay renal fibrosis, and clinical evidences are insufficient. Therefore, continuing to develop drugs for effectively treating renal fibrosis has extremely important clinical significance.

Chidamide is a benzamide histone deacetylase (HDAC) subtype selective inhibitor. Its chemical name and structure are as follows: the chemical name is N-(2-amino-4-fluorophenyl)-4-[N-[(E)-3-(3-pyridine)acryloyl]aminomethyl]benzamide, and the chemical structure formula is Molecular formula: $C_{22}H_{19}FN_4O_2$
Molecular weight: 390.42

SUMMARY

In view of the defects in the prior art, the objective of the present disclosure is to provide use of chidamide in preparing a drug for treating renal fibrosis in order to solve the problem existing in the prior art that renal fibrosis drugs only can finitely delay renal fibrosis.

The present disclosure verifies that HDAC1/2/3/10 is highly expressed in fibrotic renal tissues, wherein the HDAC1/2/3/10 expression in TGF-β stimulated HK2 renal tubular epithelial cells is up-regulated, the HDAC1/2/3/10 expression in renal fibrosis mouse model (UUO) is up-regulated, and the HDAC1/2/3/10 expression in clinical fibrotic renal tissues increases with the severity of fibrosis.

The present disclosure further proves that chidamide can significantly improve the fibrosis of TGF-β stimulated HK2. Chidamide can significantly improve the renal fibrosis of UUO mice. Chidamide can inhibit renal fibrosis by inhibiting a PI3K/Akt signaling pathway.

To sum up, the present disclosure provides use of chidamide in preparing a drug for treating renal fibrosis.

DETAILED DESCRIPTION

Referring to FIG. 1 to FIG. 8. Histone is a basic protein in eukaryotic chromatin, which constitutes a nucleosome structure together with DNA. Histone modification (including acetylation, methylation/demethylation, ubiquitination/deubiquitination, etc) can alter chromatin configuration, leading to transcription activation or gene silencing, thereby regulating gene expression.

Histone deacetylase (HDAC) is a class of important enzymes in histone modification, which is used for catalyzing or regulating histone acetylation. When a histone deacetylation level increases, normal cell cycle and metabolic behaviorswill be altered so as to trigger tumors and neurodegenerative diseases. At present, 18 types of HDAC have been found in a human body, which are divided into four classes (I, II, III, and IV).

The principle of the HDAC inhibitor as an anti-cancer drug is to inhibit the activity of histone deacetylase, increase the acetylation level of histones to trigger chromatin remodeling, alter the gene expression of multiple signaling pathways involved in tumorigenesis, and promote the arrest, differentiation and apoptosis of tumor cell growth.

Chidamide mainly targets at subtypes 1, 2 and 3 in Class I histone deacetylase (HDAC) and subtype 10 of Class IIb, and has a regulatory effect on abnormal epigenetic functions of tumors. The acetylation level of chromatin histone increases by inhibiting relevant HDAC subtypesso as to trigger chromatin remodeling, and thereforethe alteration (epigenetic alteration) in gene expression for multiple signaling transduction pathways is created, thereby inhibiting tumor cell cycle, inducing tumor cell apoptosis while possessing overall regulatory activity on organism cells, and inducing and enhancing tumor killer effects mediated by natural killer cells (NK) and antigen-specific cytotoxic T cells (CTL).

At present, an indication of chidamide approved by National Medical Products Administration (NMPA) is a patient with recurrent or refractory peripheral T-cell lymphoma who has previously received one round of systemic chemotherapy.

The histone acetylation and deacetylation of chromatin is one of key links for regulating gene expression. Under the normal physiological status, the histone acetylation and deacetylation process is in a dynamic equilibrium, which is regulated jointly by histone acetyltransferase (HAT) and HDAC. HAT is obtained by transferring an ethyl moiety of acetyl-CoA to an amino group of a specific lysine (Lys) residue on the amino terminal of chromatin core histone, which neutralizes positive charges on the amino group to facilitate the unfolding of DNA conformation so that the structure of chromatin becomes relaxed, making a transcription factor, a regulatory factor complex, and an RNA synthetase closer to DNA. Therefore, the histone acetylation can activate the transcription process of a specific gene. On the contrary, the HDAC acetylation is to remove the acetyl on the Lys residue of histone to restore the positivity of histoneand increase the attraction between DNA and histone so that the structure of histone becomes tight, making it difficult for transcription factors and their co-factors to access to transcription regulatory elements, thereby inhibiting the transcription expression of genes, including some tumor suppressor genes.

Next, the further explanation of the essential content of the present disclosure will be provided in combination with specific embodiments, and those skilled in the art can easily understand other advantages and effects of the present disclosure from the content disclosed in the specification. The present disclosure can also be implemented and applied through other different specific embodiments, various details in the specification can also be modified or altered based on different perspectives and applications without departing from the spirit of the present disclosure. It should be understood that the scope of protection of the present disclosure is not limited to the following specific embodiments.

Example 1 HDAC1/2/3/10 Participates in Renal Fibrosis

This example verified the high expression of HDAC1/2/3/10 in fibrotic renal tissues, wherein the HDAC1/2/3/10 expression in TGF-β stimulated HK2 renal tubular epithelial cells was up-regulated, the HDAC1/2/3/10 expression in renal fibrosis mouse model (UUO) was up-regulated, and the HDAC1/2/3/10 expression in clinical fibrotic renal tissues increased with the severity of fibrosis.

Figure 1:
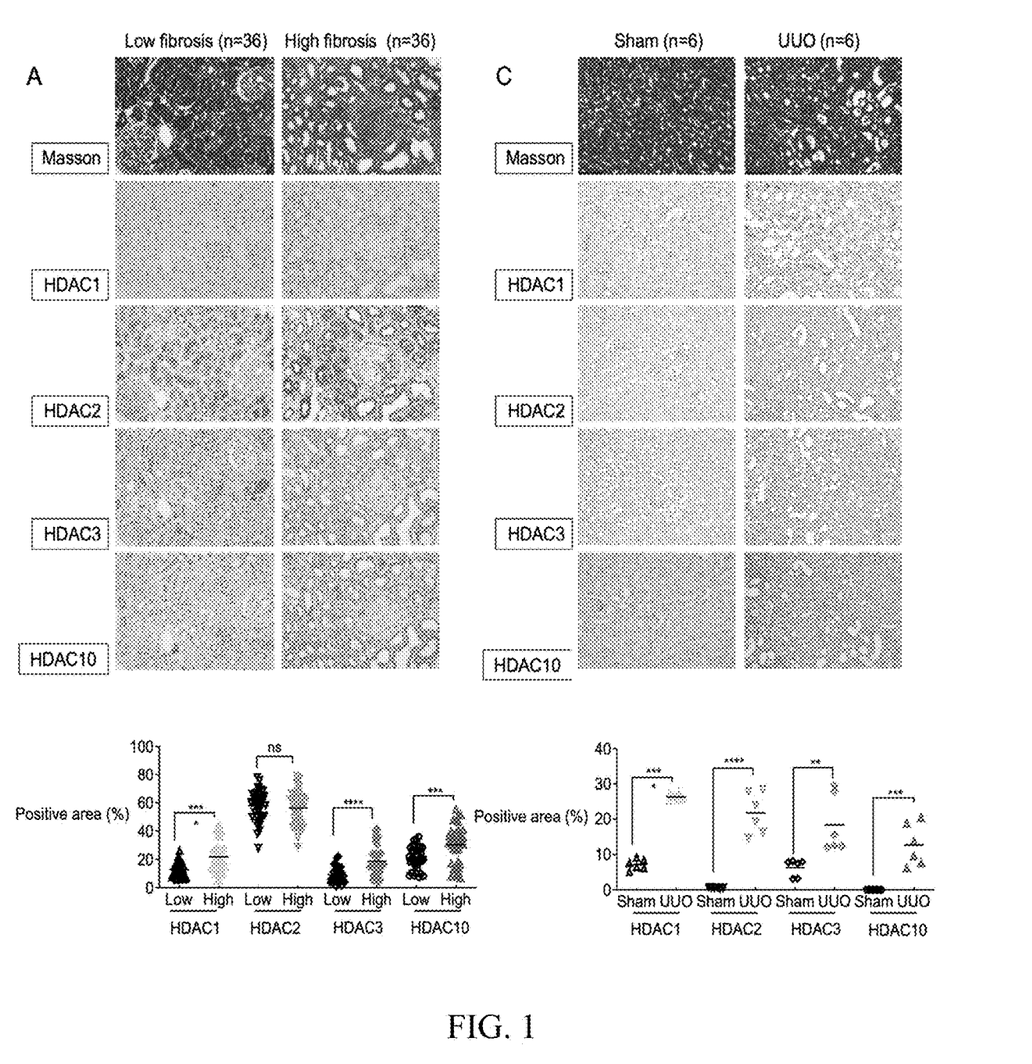
FIG. 1 is an experimental graph showing that HDAC1/2/3/10 of the present disclosure participates in renal fibrosis.

In this example, renal tissue specimens of 72 patients with chronic kidney diseases were collected. According to Masson staining scores, patients were divided into low fibrosis group (Low fibrosis, n=36) and a high fibrosis group (High fibrosis, n=36). The protein expression levels of HDAC1/2/3/10 in two groups were respectively detected through immunohistochemistry. The experimental results are as shown in FIG. 1. The results in FIG. 1 show that the protein expression of HDAC1/2/3/10 significantly increased in highly fibrotic renal tissues (FIG. 1A).

In this example, a renal fibrosis mouse model (UUO: Unilateral Uretera Obstruction, renal interstitial fibrosis model) was constructed through UUO surgery at the same time. On the 7th day after surgery, the protein expression of HDAC1/2/3/10 in test group (UUO) and control group (Sham) was detected respectively through immunoblotting and immunohistochemical tests. The experimental results are as shown in FIG. 1. The results in FIG. 1 show that the protein expression of HDAC1/2/3/10 in mice was higher than that in control group (FIG. 1B and FIG. 1C).

Furthermore, in this example, renal tubular epithelial cells HK-2 were stimulated by using different concentrations of TGF-β (transforming growth factor), the change in the HDAC1/2/3/10 protein before and after stimulation was detected through immunoblotting. The experimental results are as shown in FIG. 1. The results show that the expression of HDAC1/2/3/10 in TGF-β stimulated HK-2 cells increased (FIG. 1D). All of these experimental results prove in cells, animals and clinical specimens that the HDAC1/2/3/10 protein expression in fibrotic renal tissues increased, indicating that HDAC1/2/3/10 participated in renal fibrosis.

In FIG. 1, (A) the change in HDAC1/2/3/10 protein expression was detected by the immunohistochemical test in clinical renal specimens subjeceted to different degrees of fibrosis, wherein the picture above is a typical immunohistochemistry picture, the chart below is a statistical result table for positivity rates of proteins, which is detected by immunohistochemistry, Mean±SD, Student's t-test, *: $P<0.001$, : $P<0.0001$; (B) the change in HDAC1/2/3/10 protein expression was detected by the immunoblotting experiment in UUO mouse model, and meanwhile the change in expression of fibrosis markers α-SMA, Vimentin (Vim), Collagen I and Fibronectin (Fn) was detected; (C) the change in HDAC1/2/3/10 protein expression in renal tissues was detected by the immunohistochemical test in UUO mouse model, wherein the above picture is a typical immunohistochemistry picture, the chart below is a statistical result table for staining positivity rates of proteins detected by immunohistochemistry, Mean±SD, Student's t-test, : $P<0.01$, *: $P<0.001$, **: $P<0.0001$; (D) the change in expression of HDAC1/2/3/10 and fibrosis markers α-SMA, Vimentin (Vim), Collagen I, E-cadherin and Fibronectin (Fn) was detected by the immunoblotting experiment after renal tubular epithelial cells receive TGF-β stimulation.

Example 2 Chidamide Significantly Improves the Fibrosis of TGF-β Stimulated Renal Tubular Epithelial Cells Example 1 verified that HDAC1/2/3/10 can participate in renal fibrosis, and example 2 further explored the effect of chidamide on renal fibrosis in TGF-β stimulated renal tubular epithelial cells. In example 2, cells were treated by using different concentrations of chidamide and then stimulated by adding TGF-β, and the protein expression and mRNA levels of fibrosis markers were detected respectively by using immunoblotting and qPCR experiments. The results show that after TGF-β stimulation, the protein expression (FIG. 2A-C) and the mRNA level (FIGS. 2D-E) of fibrosis markers of HK-2 cells both significantly increased, indicating that TGF-β successfully stimulated HK-2 to construct a fibrotic cell model; the protein expression (FIG. 2A-C) and the mRNA level (FIG. 2D-E) of fibrosis markers both significantly decreased after chidamide was administrated, indicating that chidamide can significantly inhibit the fibrosis of TGF-β induced renal tubular epithelial cell HK-2.

Figure 2:
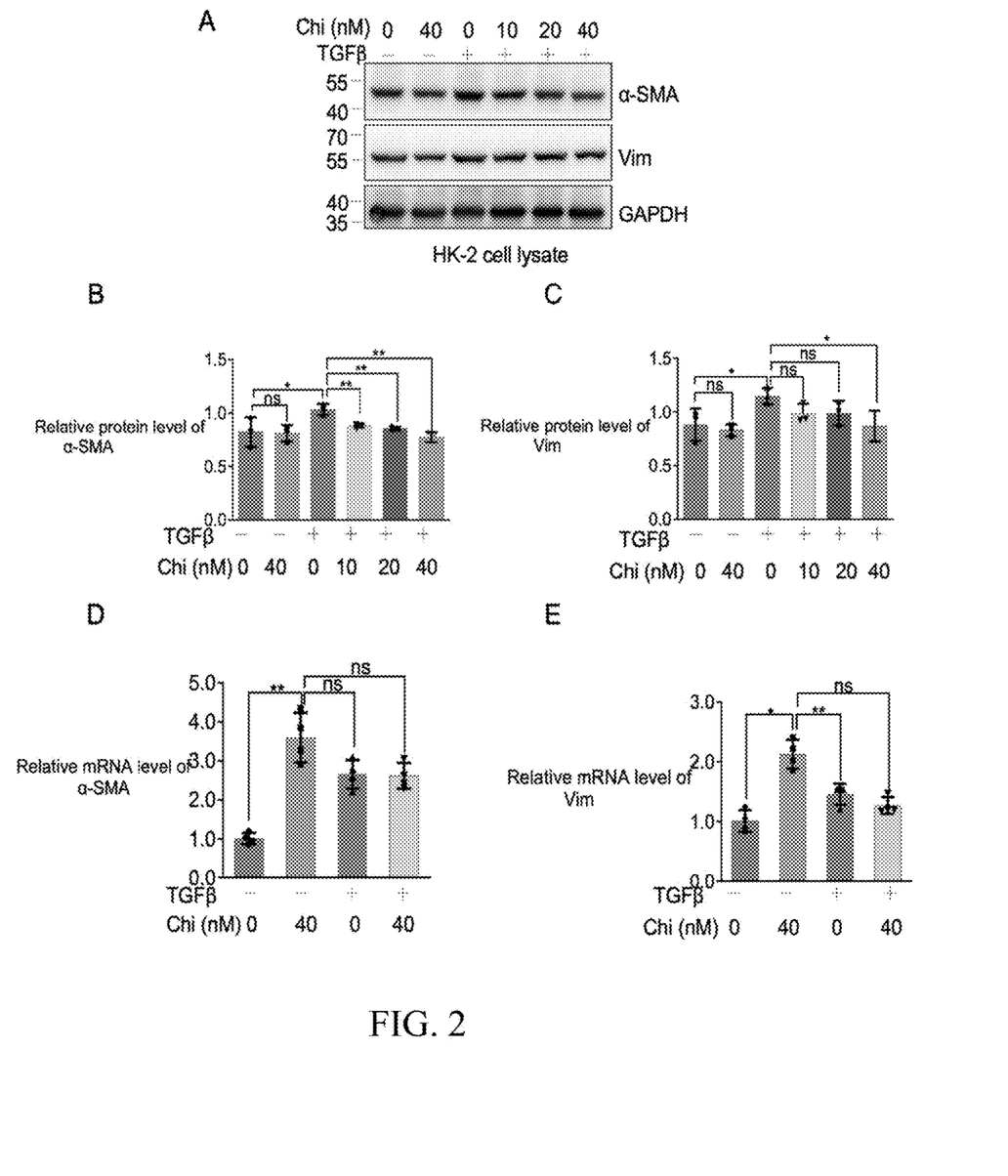
FIG. 2 is a change graph showing that chidamide significantly improves protein expression of fibrosis markers of TGF-β stimulated renal tubular epithelial cells.

In FIG. 2, (A) the effect of different concentrations of chidamide on protein expression of fibrosis markers α-SMA and Vimentin (Vim) in TGF-β stimulated HK-2 cells was detected by the immunoblotting experiment; (B-C) the statistical results of α-SMA and Vimentin in FIG. A in 3 biological duplications, Mean±SDs, Student's t-test, *: $P<0.05$; **: $P<0.01$; (D-E) the effect of different concentrations of chidamide on protein expression of fibrosis markers α-SMA and Vimentin (Vim) was detected by the qPCR experiment in TGF-β stimulated HK-2 cells, and the statistical resultsare 3 technical duplications, Mean±SD, Student's t-test, *: P<0.05, : P<0.01, *: P<0.001, ****: P<0.0001.

Example 3 Chidamide Significantly Improves Renal Morphology and Renal Functions of UUO Mice This example further explored the effect of chidamide on renal fibrosis. In example 3, the effect of chidamide on renal morphology and renal functionswas verified in a fibrotic UUO mouse model.

In this example, mice were divided into 7 groups at random with 7 mice in each group, which were Sham group (sham), Sham+chidamide group (Sham-Chi 10 mg/kg/d), model group (UUO), UUO+Enacept positive control group (UUO-En 10 mg/kg/d), UUO+chidamide low-dose administration group (UUO-Chi 1 mg/kg/d), UUO+chidamide medium-dose administration group (UUO-Chi 5 mg/kg/d) and UUO+chidamide high-dose administration group (UUO-Chi 10 mg/kg/d), respectively. All drugs were administrated by gavage 3 days before modeling, once a day, until 7 days after surgery. Mice were weighed everyday after surgery, and then growth curves were plotted. After administration was ended, the mice were anesthetized, the eye sockets were removed and bloods were collected for the detection of serum creatinine (Scr) and urea nitrogen (BUN). At the same time, left and right kidneys were taken and then weighed after hydronephrosis was removed, so as to obtain the renal weight indexes of the obstructed kidneys in mice (kidney weight/mouse weight at the obstructed side). The photos were taken.

The weight growth curve results (FIG. 3A) of mice show that both the UUO surgery and intragastric administration of chidamide at various doses did not affect the growth of mice. The weight index results (FIG. 3B) of mouse renal tissues show that compared with Sham group, in UUO group, ureters were dilated, renal tissues were severely damaged, urine squeezed the renal tissues to only a thin layer of cortex, and the obstruction renal weight indexsignificantly increased, indicating successful modeling; compared with UUO group, the ureteral dilation degree and the renal tissue squeezing degree in UUO+chidamide group were both less than those in corresponding UUO group, and the obstructionrenal weight index significantly decreased, indicating that chidamide can alleviate renal tissue damage of UUO after surgery so as to take the effect of protecting kidney. The Scr and BUN detection experiment results (FIG. 3C-D) show that compared with Sham group, the levels of Scr and BUN in UUO group obviously increase, indicating that UUO modeling damages the functions of the kidney. However, serum creatinine Scr and urea nitrogen BUN obviously fall back after chidamide is administrated, indicating that chidamide has the effect of protecting renal functions. The above experiment results show that chidamide can significantly improve the morphological changes and renal functions of UUO mice.

Figure 3:
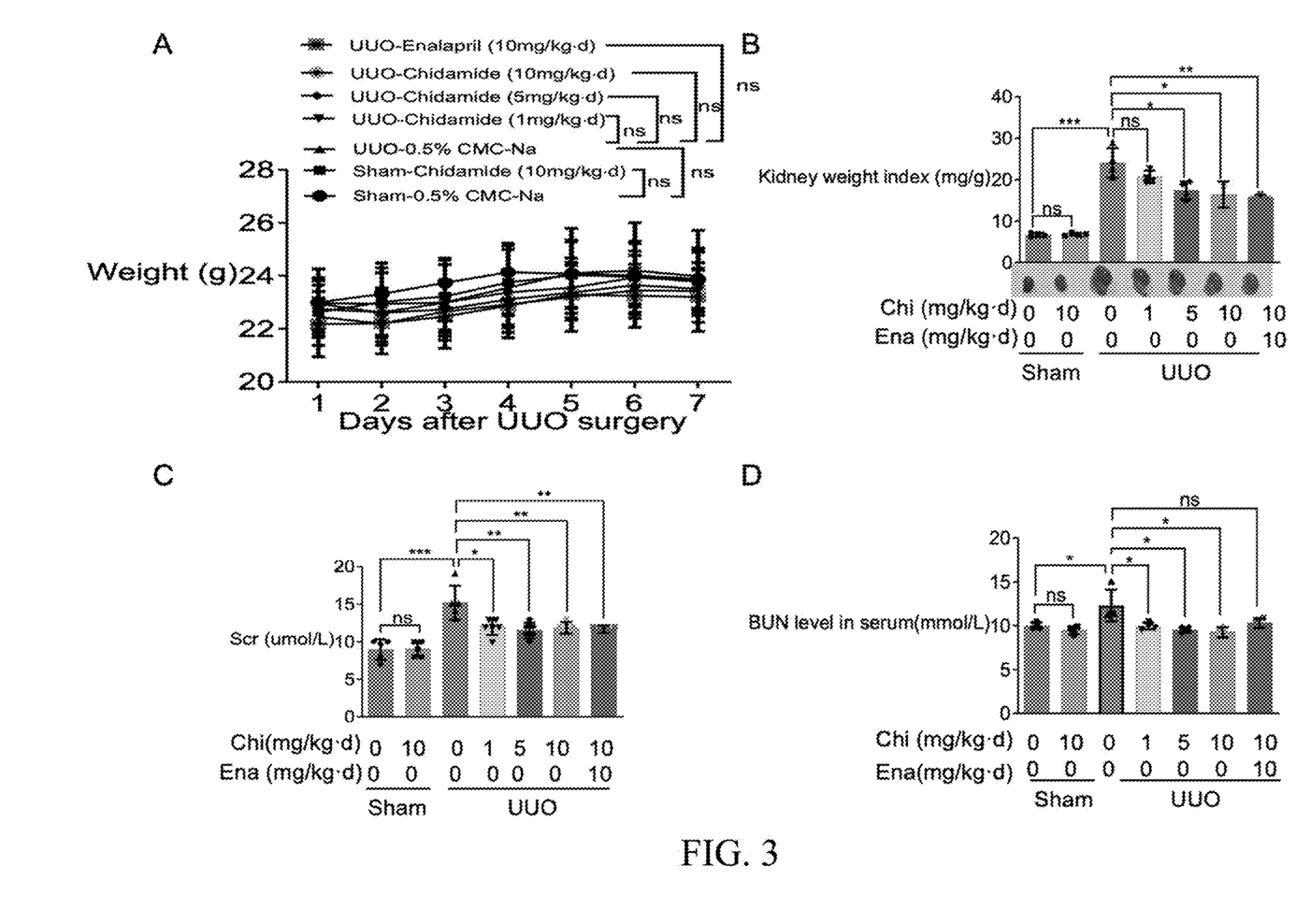
FIG. 3 is an experimental result graph showing that chidamidesignificantly improves renal morphological change and renal functions of UUO mice.

In FIG. 3, (A) the weight growth curve of mice verified the effect of UUO modeling and intragastric administration of chidamide on mouse weight, n=7, Mean±SDs, Student's t-test, ns: not significant; (B) the renal weight index change of mice (the statistical chart above, n=4, Mean±SDs, Student's t-test, *: P<0.05, : P<0.01, **: P<0.0001, ns: not significant) and renal tissue in vitro photos (below) verified the effect of chidamide on renal morphological changes of UUO mice; (C-D) mouse creatinine (C) and urea nitrogen (D) changes verified the effect of chidamide on renal functions of UUO mice, n=5-6, Mean±SDs, Student's t-test, *: P<0.05, : P<0.01, *: P<0.001, ns: not significant.

Example 4 Chidamide Significantly Improves the Deposition of Renal Interstitial Collagen Fibers of UUO Mice In the above constructed UUO mouse model of this example, the effect of chidamide on renal interstitial collagen fiber deposition was detected further by Masson staining. The results show that there are a large amount of collagen fiber deposition in the renal interstitium of the UUO mouse, however, the collagen fiber deposition is significantly improved after chidamide is administrated, indicating that chidamide can effectively alleviate the deposition of UUO renal interstitial collagen fibers.

Figure 4:
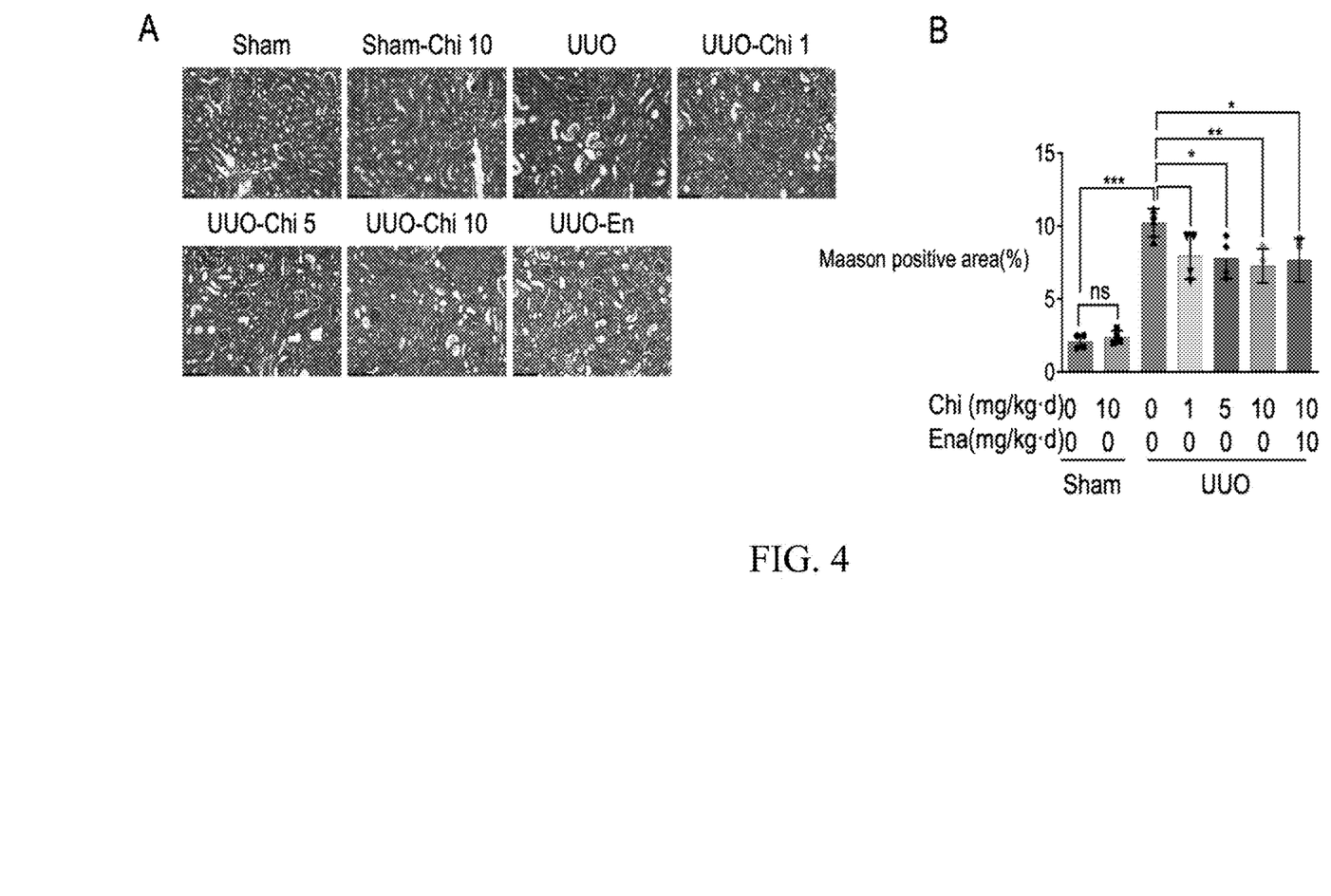
FIG. 4 is an experimental result graph showing that chidamide significantly inhibitsrenal interstitial collagen fiber deposition of UUO mice.

In FIG. 4, (A-B) the deposition of renal interstitial collagen fibers was detected after UUO modeling and chidamide was administrated, (A) a typical picture for Masson staining; (B) the statistical results of Masson staining area proportion, n=6, Mean±SDs, Student's t-test, *: P<0.05, : P<0.01, **: P<0.0001, ns: not significant.

Example 5 Chidamide Significantly Improves the Renal Fibrosis of UUO Mice

In this example, the improvement effect of chidamide on UUO renal fibrosis was further detected. In the above constructed UUO mouse model of this example, the effect of chidamide on protein expression of renal fibrosis markers was detected respectively by immunohistochemistry and immunoblotting experiments, and the change in fibrosis marker mRNA was detected by the qPCR experiment. The results show that the protein expression (FIGS. 5A-E) and mRNA (FIGS. 5F-I) of the fibrosis markers in UUO mouse renal tissues both significantly increased, however, these indexes significantly fall back after chidamide was administrated, indicating that chidamide can effectively alleviate the renal fibrosis of UUO mice.

Figure 5:
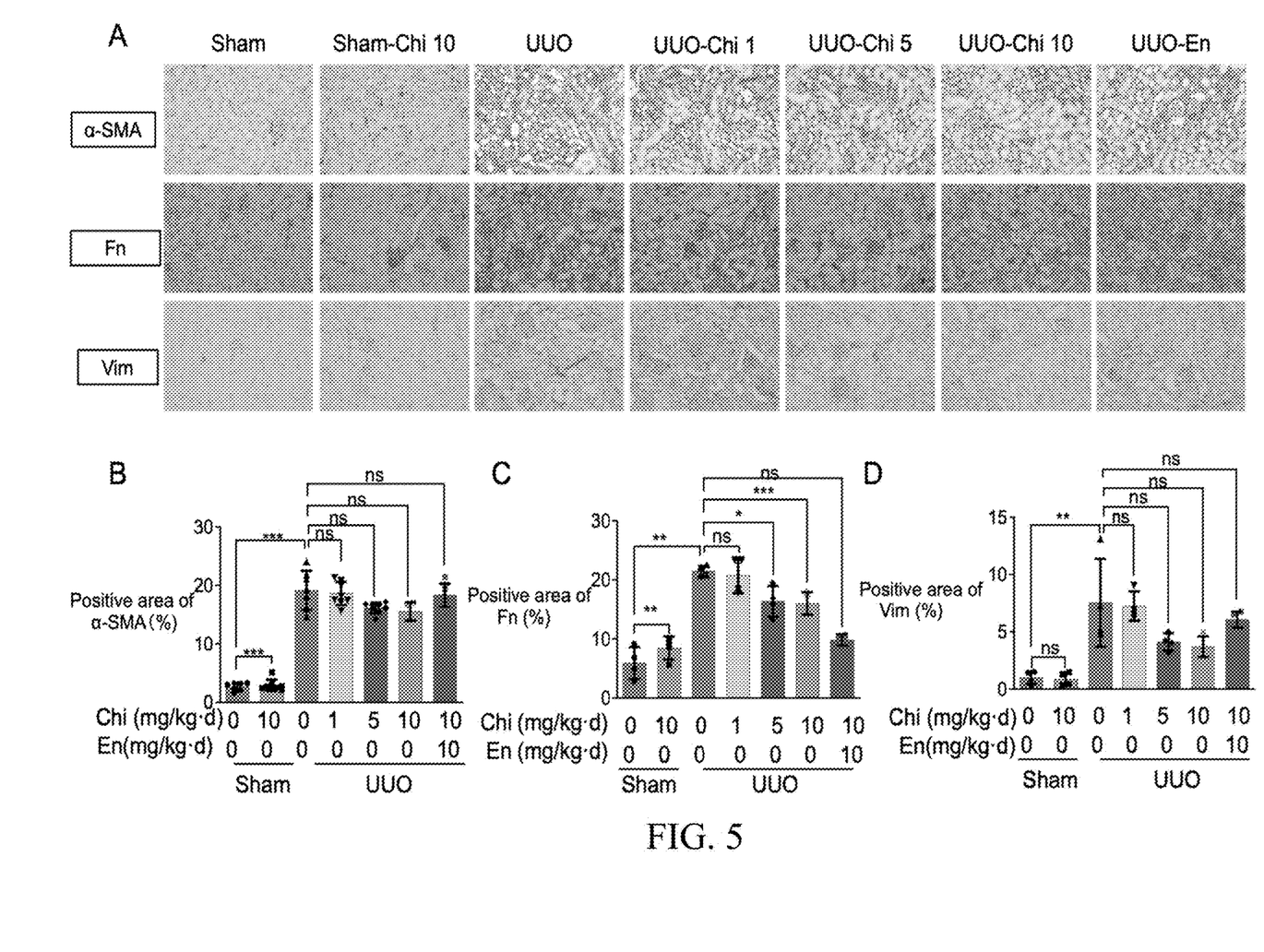
FIG. 5 is an experimental result graph showing that chidamide significantly inhibits protein expression of UUO mouse fibrosis markers.

In FIG. 5, (A-D) the change in protein expression of renal fibrosis markers α-SMA, Fibronectin (Fn) and Vimentin (Vim) was detected by immunohistochemistry after UUO modeling and chidamide was administrated, (A) the typical pictures for detecting fibrosis markers by immunohistochemistry; (B-D) the statistical charts showing immunohistochemical detection results of fibrosis markers, n=6, Mean±SDs, Student's t-test, *: P<0.05, *: P<0.001, : P<0.0001, ns: not significant; (E) the protein expression of renal fibrosis markers α-SMA, Fibronectin (Fn), Collagen I and E-cadhenrin (E-cad) was detected by the immunoblotting experiment after UUO modeling and chidamide was administrated, and the results of 2 mice in each group were shown; (F-I) the mRNA change in renal fibrosis markers α-SMA, Fibronectin (Fn), Collagen I and Vimentin (Vim) was detected by the qPCR experiment after UUO modeling and chidamide was detected, the statistical results were 3 technical duplications, Mean±SD, Student's t-test, **: P<0.0001, ns: not significant.

Example 6 (1) Chidamide Affects a PI3K/Akt Signaling Pathway

This example further explored that chidamide affects renal fibrosis through which downstream pathway. In this example, whole genome sequencing analysis was performed on UUO mouse renal tissues treated by chidamide and controls thereof. Based on p<0.05, FoldChange≥2 as a standard, the results of 3 biological duplications were quantified to obtain 281 differential genes including 73 up-regulated genes and 208 down-regulated genes. A heatmap of differential genes was plotted (FIG. 6A), and GO enrichment (FIG. 6B) and KEGG signaling pathway analysis (FIG. 6C) were performed on the differential genes, gene set enrichment analysis (GSEA) (FIG. 6D) was further performed on TGF-β signaling pathways and PI3K/Akt signaling pathways in KEGG. The results show that after being treated with chidamide, most of the significantly differential genes of mice were enriched in cytokine-cytokine receptor interaction, a PI3K/Akt signaling pathway, an MAPK signaling pathway, etc.

Figure 6:
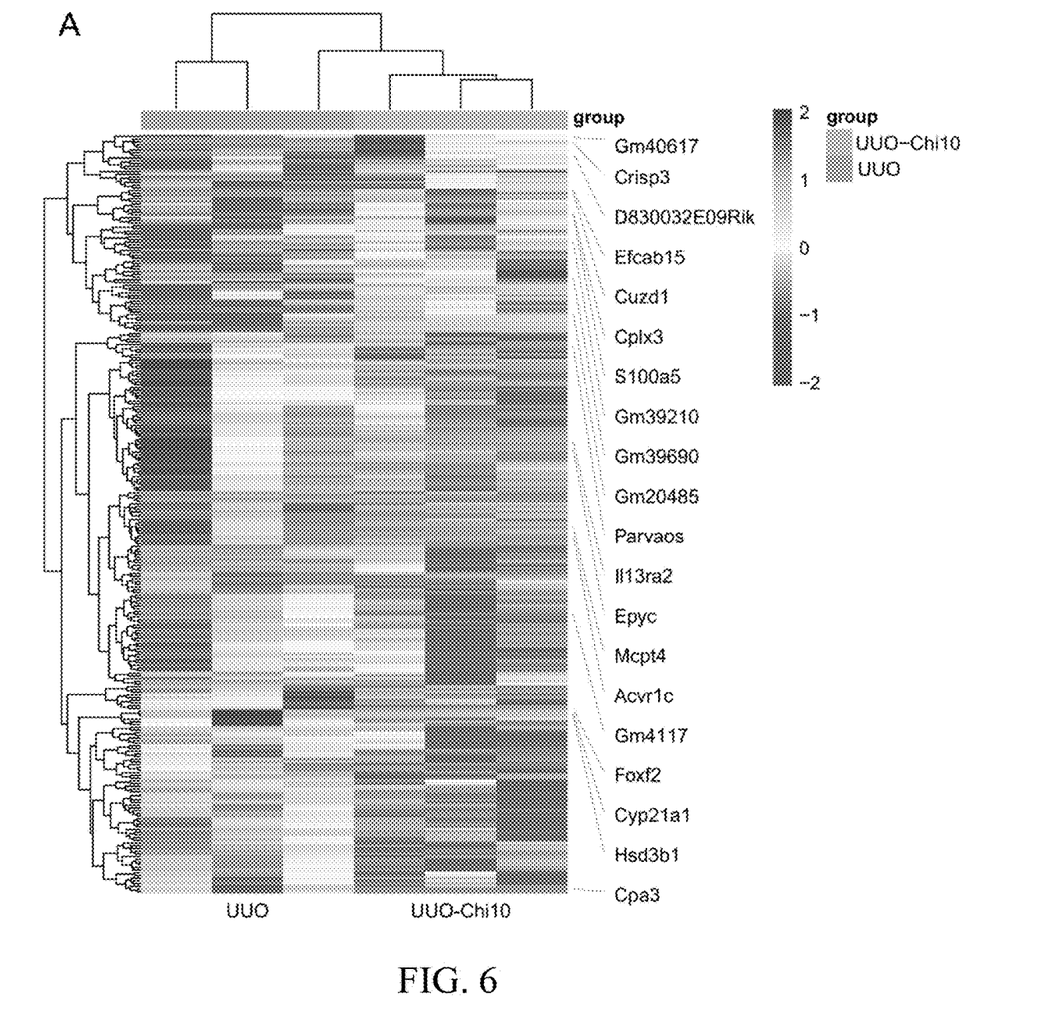
FIG. 6 is an experimental result graph showing that chidamide affects the inhibition of a PI3K/Akt signaling pathway.

In FIG. 6, (A) the heatmap UUO-Chi-vs-UUO of differential genes was obtained by quantification of 3 biological duplications, p<0.05, FoldChange≥2, in the figure, red represents a relative highexpression protein coding gene, blue represents a relative low expressed protein coding gene; (B) a GO enrichment bar graph of differentially expressed genes (top30), in the figure, the vertical axis represents GO item names, and the horizontal axis represents $-\log_{10}$ p-value; (C) a KEGG enrichment bubble chart of differentially expressed genes (top20), in the figure, the horizontal axis represents Enrichment Score, the larger the bubble, the more the differential protein coding genes included in the item, the color of the bubblechanges from blue to white to yellow to red, the smaller enrichment p-value showed the greater significance level; (D) gene set enrichment analysis of MAPK signaling pathway (upper) and PI3K/Akt signaling pathway (lower).

(2) Chidamide Inhibits a PI3K/Akt Signaling Pathway

The PI3K-Akt signaling pathway is an intracellular signal transduction pathway which responds to extracellular signals, promotes metabolism, proliferation, cell survival, growth and angiogenesis, and participates in pathophysiological processes of multiple diseases. The study shows that the PI3K-Akt signaling pathway participates in the regulation of renal fibrosis through expression of multiple downstream media including mTOR, autophagy and the like. Our transcriptomic results have suggested that chidamide treatment can significantly affect the PI3K/Akt signaling pathway in UUO mouse model. To further confirm whether the PI3K/Akt signaling pathway participates in the regulation of chidamide on renal fibrosis, this example examined the effect of chidamide on the PI3K/Akt signaling pathway in TGF-β stimulated renal tubular epithelial cell HK-2 and UUO mouse model, respectively, and the results show that after chidamide treatment, the p-PI3K/PI3K and p-Akt/Akt ratios in TGF-β stimulated HK-2 cells (FIGS. 7A-C) and UUO mouse model (FIG. 7D) were significantly reduced. Subsequently, this example further examined the effects of chidamide on certain key proteins at the downstream of the PI3K/Akt signaling pathway in TGF-β stimulated renal tubular epithelial cell HK-2 and UUO mouse model, and the results show that chidamide can restore an autophagy flow in TGF-β stimulated HK-2 cells (FIG. 7E) and UUO mouse model (FIG. 7F), and reduce the p-mTOR/mTOR ratio. The above experimental results all verify that chidamide can inhibit the PI3K/Akt signaling pathway.

Figure 7:
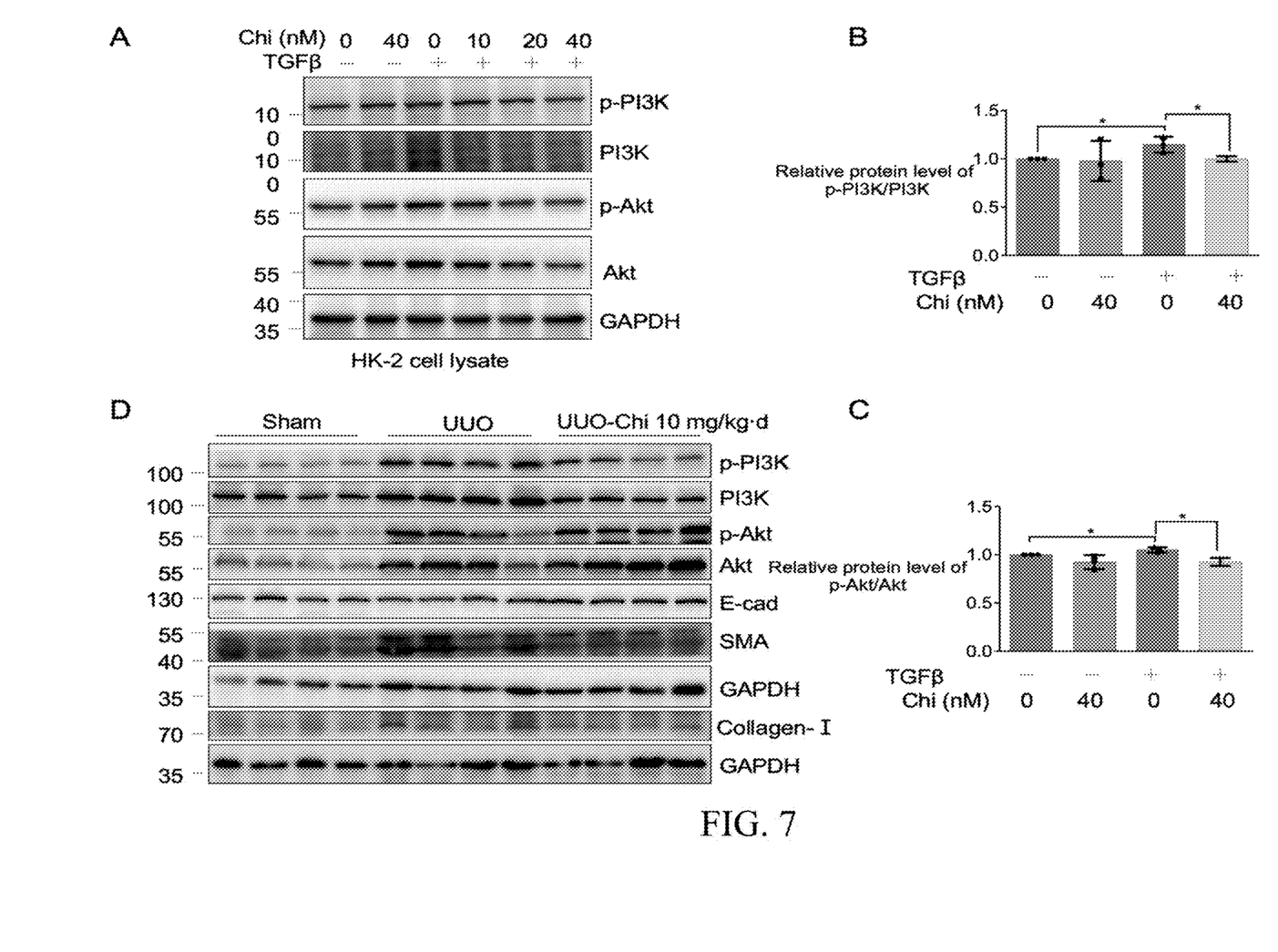
FIG. 7 is an experimental result graph showing that chidamide inhibits renal fibrosis through PI3K/Akt.

In FIG. 7, (A) the effects of chidamide onprotein expression of p-PI3K, PI3K, p-Akt and Akt in TGF-β stimulated renal tubular epithelial cell HK-2 were detected by the immunoblotting experiment; (B-C) the statistical charts showingthe effect of chidamide onp-PI3K/PI3K and p-Akt/Akt ratios in TGF-β stimulated renal tubular epithelial cell HK-2, n=3, Mean±SDs, Student's t-test, *: P<0.05; (D) the effectof chidamide on protein expression of p-PI3K, PI3K, p-Akt and Akt in UUO mouse model was detected by the immunoblotting experiment (n=4); (E) the effect of chidamide on proein expression of autophagy markers of TGF-β stimulated renal tubular epithelial cell HK-2 was detected by the immunoblotting experiment; (F) the effect of chidamide on protein expression of autophagy markers as well as p-mTOR and mTOR in UUO mouse model was detected by the immunoblotting experiment (n=4).

Example 7 Chidamide Inhibits Renal Fibrosis Through a PI3K/Akt Signaling Pathway To further verify whether chidamide indeed takes the effect of inhibiting renal fibrosis through a PI3K/Akt signaling pathway, in this example, the effect of PI3K inhibitor LY 294002 (LY) on renal fibrosis was verified in TGF-β stimulated renal tubular epithelial cells HK-2, the results show that (FIG. 8A) LY 294002 can inhibit the protein expression of fibrosis markers Collagen I and α-SMA in TGF-β stimulated renal tubular epithelial cells HK-2 at a dose-dependent manner, indicating that the PI3K inhibitor indeed can inhibit the progression of renal fibrosis. Subsequently, this example further investigated the change of chidamide on fibrosis markers after LY 294002 treatment was used in TGF-β stimulated renal tubular epithelial cells HK-2. The results show that (FIG. 8B) a PI3K inhibitor and chidamide can inhibit the protein expression of fibrosis markers Collagen I and α-SMA when in use alone, however, chidamide cannot affect the expression of fibrosis markers any more if the PI3K inhibitor is used simultaneously. The above experimental results initially verify that chidamide is very likely to inhibit the progression of renal fibrosis through the PI3K/Akt signaling pathway.

Figure 8:
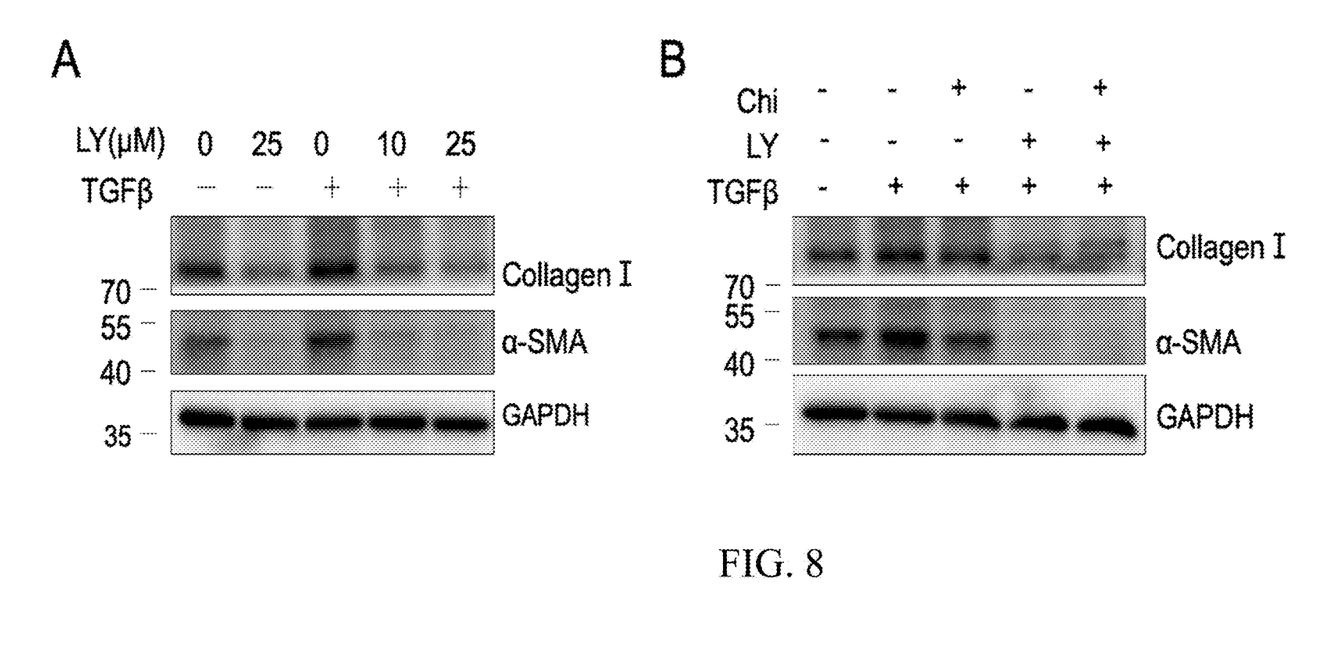
FIG. 8 is an experimental result graph showing the effect of a PI3K inhibitor on renal fibrosis.

In FIG. 8, (A) the effect of different concentrations of LY 294002 (LY) on protein expression of fibrosis markers Collagen I and α-SMA in TGF-β stimulated renal tubular epithelial cells HK-2 was detected by the immunoblotting experiment; (B) the effect of LY 294002 (LY) on fibrosis marker Collagen I and α-SMA protein expression by chidamide was detected in TGF-β stimulated renal tubular epithelial cells HK-2 by the immunoblotting experiment.

Therefore, in conclusion, chidamide has great potential in the preparation of drugs for the treatment and/or improvementof renal fibrosis diseases, and has high industrial utilization value.

The aboveembodiments are only illustrative of the principles and effects of the present invention, and are not intended to limit the present disclosure. When the embodiments provide numerical ranges, it should be understood that, unless otherwise specified in the present invention, both endpoints of each numerical range and any value between the endpoints can be selected. Unless otherwise defined, all technical and scientific terms used in the present disclosure have the same meanings as those commonly understood by those skilled in the art. Except specific methods, equipment and materials used in embodiments, based on the mastery of the prior art by technical personnel in this field and the description of the present invention, any prior art methods, equipment, and materials similar or equivalent to those described in the embodiments of the present disclosure can also be used to implement the present disclosure. Modifications or changes can be made to the above embodiments by those skilled in the art without departing from the spirit and scope of the present disclosure. Therefore, every equivalent modifications or changes completed by those skilled in the art without departing from the spirit and technical thinking disclosed present disclosure still should be included within the appended claims of the present disclosure.

What is claimed is:

1. A method for treating renal fibrosis, comprising administering to a subject in need a pharmaceutical composition comprising a therapeutically effective dose of chidamide, wherein the chidamide is administered orally at a dose of 1-10 mg/kg/day for at least 7 days to ameliorate renal fibrosis.

2. The method according to claim 1, wherein the chidamide inhibits the activity of HDAC1, HDAC2 and HDAC3 by at least 50%, and exhibits a significantly higher inhibitory effect on HDAC10 compared to HDAC6.

3. The method according to claim 1, wherein the chidamide inhibits PI3K/Akt signaling pathway by reducing the ratios of p-PI3K/PI3K and p-Akt/Akt by at least 30%.

4. The method according to claim 1, wherein the renal fibrosis is TGF-β induced renal fibrosis.

5. The method according to claim 1, wherein the renal fibrosis comprises the deposition of renal interstitial collagen fibers.

6. The method according to claim 1, wherein the renal fibrosis is fibrosis caused by ureteral obstruction.

7. The method according to claim 1, wherein the chidamide has the effect of inhibiting the generation of renal fibrosis markers.

8. The method according to claim 1, wherein the administration reduces serum creatinine (Scr) and blood urea nitrogen (BUN) levels both by at least 30% and 35%, respectively.

* * * * *